United States Patent [19]

Lee

[11] Patent Number: 5,726,544
[45] Date of Patent: Mar. 10, 1998

[54] SPEED CONTROL APPARATUS AND METHOD FOR ELECTRIC CAR

[75] Inventor: Sung Byum Lee, Kyungkido, Rep. of Korea

[73] Assignee: Hyundai Motor Company, Seoul, Rep. of Korea

[21] Appl. No.: 720,730

[22] Filed: Oct. 1, 1996

[51] Int. Cl.$^6$ .................................................. H02P 1/00
[52] U.S. Cl. ..................... 318/271; 318/139; 123/352; 123/478; 123/399
[58] Field of Search ........................... 318/139; 123/352, 123/478, 399, 479, 480, 350, 494

[56] References Cited

U.S. PATENT DOCUMENTS

| | | | |
|---|---|---|---|
| 599,548 | 7/1898 | Schultz | 318/599 |
| 4,423,498 | 12/1983 | Kimura et al. | 369/47 |
| 4,603,675 | 8/1986 | Junginger et al. | 123/478 |
| 4,761,591 | 8/1988 | Hartwig | 318/345 |

FOREIGN PATENT DOCUMENTS 7-99702  4/1995  Japan .

*Primary Examiner*—William M. Shoop, Jr.
*Assistant Examiner*—Kim Lockett
*Attorney, Agent, or Firm*—Finnegan, Henderson, Farabow, Garrett & Dunner, L.L.P.

[57] ABSTRACT

A speed control apparatus and method for an electric car serving to aid driving and producing alarm signal if one of variable resistors, which are installed in an accelerator pedal, is out of order. The speed control apparatus for an electric car comprises at least two variable resistors for generating speed control signals, each resistance value of the variable resistors varying in accordance with stepping on the accelerator pedal, a waveform shaping section for waveform-shaping output signals of the variable resistors to remove noise components and amplifying the waveform-shaped output signals, an interface section for selectively providing the output signals of the waveform shaping section in accordance with a control signal, an analog-to-digital converter for converting output signal of the interface section into a digital signal, an electronic control unit for providing the control signal to the interface section so as to selectively receive one of the speed control signals from the variable resistors to produce a driving signal, the electronic control unit detecting a difference value between the speed control signals, controlling a driving speed of the electric car according to selected one of the speed control signals if the detected difference value is lower than a predetermined value, and producing an alarm control signal for cutting off the driving signal to stop the electric car, if the detected difference value is higher than a predetermined value, and an alarm section for producing an alarm signal according to the alarm control signal provided from the electronic control unit.

2 Claims, 2 Drawing Sheets

SPEED CONTROL APPARATUS AND METHOD FOR ELECTRIC CAR

BACKGROUND OF THE INVENTION

1. Field of the Invention

The present invention relates to a speed instructing apparatus and method for an electric car which can produce a speed instructing signal (i.e., speed command signal) to a speed controller according to a driver's stepping on an accelerator pedal.

2. Description of the Prior Art

Electric cars generally have a driving motor, and the driving speed of the motor is controlled according to a speed instructing signal which is produced according to a driver's stepping on an accelerator pedal in order to change the driving speed of the electric car. The accelerator pedal is typically provided with a variable resistor which resistance value varies in accordance with a driver's stepping on the accelerator pedal, and the speed instructing signal is produced in proportion to the resistance value of the variable resistor.

Japanese patent publication No. 7-99702 discloses motor controller for electric vehicle, in which: an inverter converts the DC power of a battrey into AC Power according to the command signal of a current command generating section, and suppies an AC motor with AC power. Three current sensors arranged between the inverter and the motor detects currents fed to the motor. The driving-direction detecting section of a motor driving control section is supplied with the current detecting signals of each current sensor and the driving direction is detected. An abnormality discriminating section is also fed with the command signal from the current command generating section, and the abnormality discriminating section discriminates whether or not abnormality is generated. When abnormality is generated, an alarm section is supplied with an alarm command signal by the abnormality discriminating section, and current command generating section is fed with an operation stop signal.

The conventional speed control apparatus, however, has one variable resistor for generating the speed control signal. Therefore, if the variable resistor is out of order, the speed control signal may be abnormally produced. This causes the driver to lose precise control of the driving speed of the electric car, which may cause a traffic accident.

SUMMARY OF THE INVENTION

It is an object of the present invention to solve this conventional problem, and to provide a speed control apparatus and method for an electric car which can effectively control the driving speed of the electric car by employing at least two variable resistors for generating speed control signals in an accelerator pedal, determining if the variable resistors are out of order by comparing the difference value between the speed control signals from the variable resistors, and producing an speed control signal if the difference value is determined to be higher than a predetermined value.

Speed control apparatuses for an electric car, consistent with the invention, include at least two variable resistors for generating speed control signals. Each resistance value of the variable resistors varies in accordance with stepping on the accelerator pedal. A waveform shaping means shapes the waveforms of the output signals of the variable resistors to remove noise components and also amplifies these signals. An interface means selectively provides the output signals of the waveform shaping means in accordance with a control signal. Also included is an electronic control means that provides the control signal to the interface means in order to selectively receive one of said speed control signals from the variable resistors to produce a driving signal. The electronic control means detects a difference value between the speed controls and controls a driving speed of the electric car according to the selected one of the speed control signals, if the detected difference value is lower than a predetermined value. The electronic control means also produces an alarm control signal for cutting off the driving signal to stop the electric car, if the detected difference value is higher than a predetermined value. Finally, the speed control apparatus also includes an alarm means for producing an alarm signal according to the alarm control signal provided from the electronic control means.

In another aspect, the invention includes a speed control method for an electric car. The method includes the step of inputting at least two speed control signals for controlling a driving speed of the electric car which are generated by stepping on an accelerator pedal of the electric car. Next, a difference value of the two speed control signals is calculated and then compared with a predetermined value. One of the two speed control signals is then selected to control driving speed, if the difference value is lower that a predetermined value. In the event of an abnormal condition, the speed control signal is cut off to stop the car, if the difference value is higher than the predetermined value.

BRIEF DESCRIPTION OF THE DRAWINGS

This invention will be more clearly understood from the description of the preferred embodiments as set forth below with reference to the accompanying drawings in which.

DETAILED DESCRIPTION OF THE PREFERRED EMBODIMENT

The preferred embodiment of the present invention will be described in further detail with reference to the attached drawings.

Figure 1:
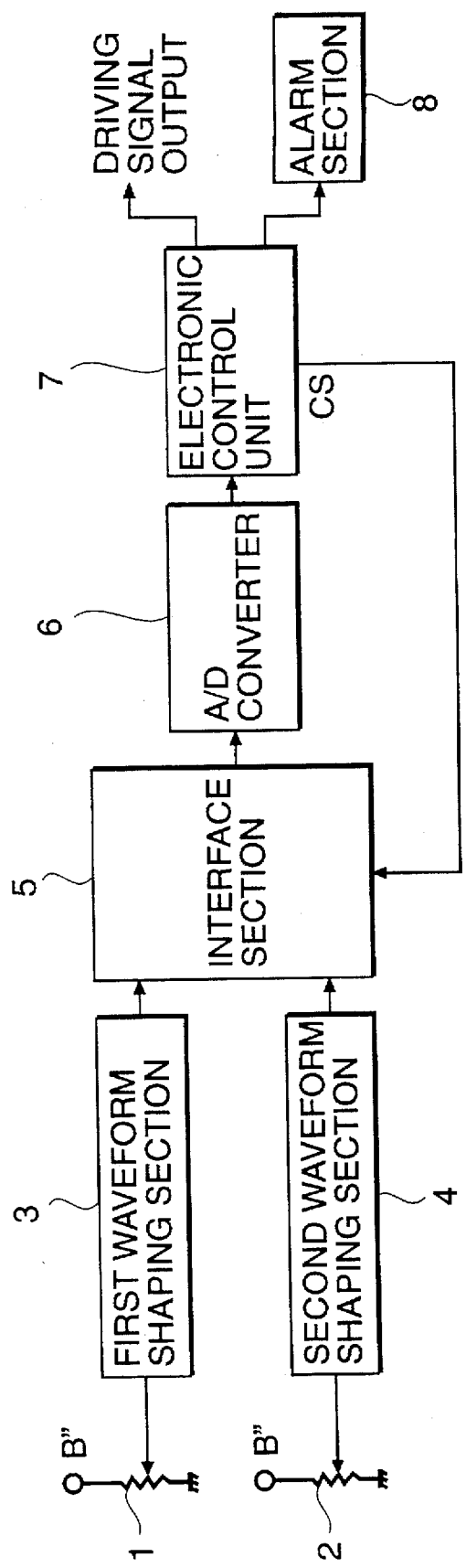
FIG. 1 is a block diagram illustrating a speed control apparatus according to the present invention.

Referring to FIG. 1, the construction of a speed control apparatus for electric car is described.

The speed control apparatus for electric car, as shown in FIG. 1, comprises at least two variable resistors 1, 2 for generating speed control signals, each resistance value of the variable resistors 1, 2 varying in accordance with stepping on the accelerator pedal, a waveform shaping section 3, 4 for waveform-shaping output signals of the variable resistors 1, 2 to remove noise components and amplifying the waveform-shaped output signals, an interface section 5 for selectively providing the output signals of the waveform shaping section 3, 4 in accordance with a control signal, an analog-to-digital converter 6 for converting output signal of the interface section 5 into a digital signal, an electronic control unit 7 for providing the control signal to the interface section 5 so as to selectively receive one of the speed control signals from the variable resistors 1, 2 to produce a driving signal, the electronic control unit 7 detecting a difference value between the speed control signals, controlling a driving speed of the electric car according to selected one of the speed control signals if the detected difference value is lower than a predetermined value, and producing an alarm control signal for cutting off the driving signal to stop the electric car, if the detected difference value is higher than a predetermined value, and an alarm section 8 for producing an alarm signal according to the alarm control signal provided from the electronic control unit 7.

In a method of speed control for an electric car of the present invention, when power supply B⁺ is applied to two variable resistors 1, 2, a driver steps on the accelerator pedal on his driving, the resistance values of the two variable resistors 1, 2 installed in the accelerator pedal vary according to the pressure from stepping on the accelerator pedal. Such two speed control signals outputted from two variable resistors 1, 2 are inputted to the waveform shaping section 3, 4 respectively, to remove noise components, to shape the waveform, and to amplify its output signal to be applied to the interface section 5. The interface section 5 selectively selects the output signal of the waveform shaping section 3, 4 according to the control signal CS, and provides its output signal to the analog-to-digital converter 6 to convert an analog signal into a digital signal, and next provides its output signal to the electronic control unit 7.

Figure 2:
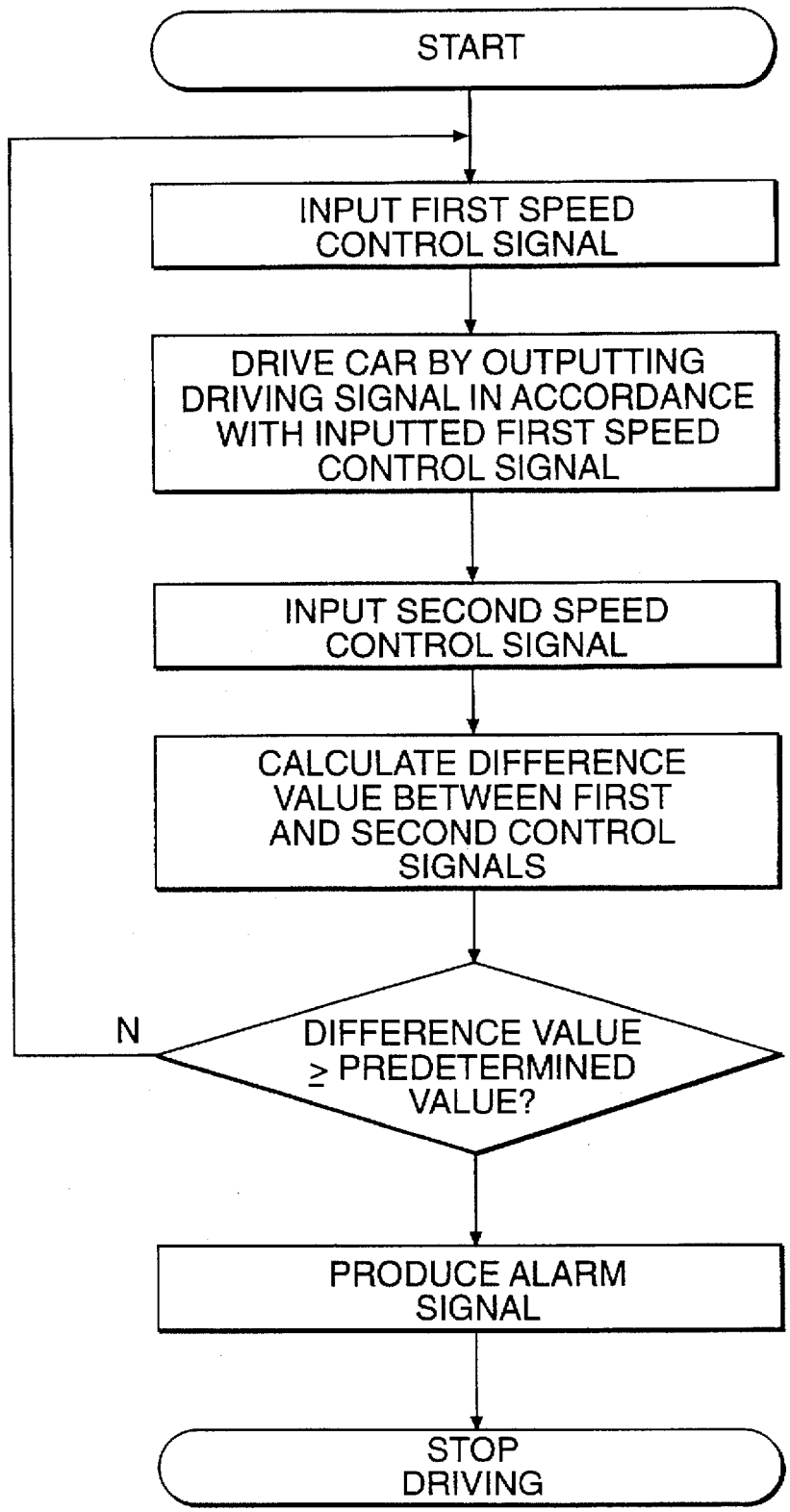
FIG. 2 is a flow chart illustrating a speed control method according to the present invention.

Meanwhile, the electronic control unit 7, as shown in FIG. 2, provides the control signal CS to the interface section 5 for selectively receiving the first speed control signal through the variable resistor 1, the waveform shaping section 3, and the analog-to-digital converter 6 so as to control a driving speed of the electric car according to the first speed control signal.

On the other hand, the electronic control unit 7 provides the control signal CS to the interface section 5 to selectively receive the second speed control signal through the variable resistor 2, the waveform shaping section 4 and the analog-to-digital converter 6 so as to control the driving speed of the electric car according to the second speed control signal.

At this time, the electronic control unit 7 calculates difference value between the first and second speed control signals.

Next, the electronic control unit 7 compares the difference value with a predetermined value. If the difference value is lower than the predetermined value, the output signal of the variable resistor 1 means normal condition for driving the car.

However, if the difference value is higher than the predetermined value, the output signal of the variable resistor 2 means abnormal condition for driving the car and the electronic control unit 7 produces the alarm control signal to stop driving the car by cutting the driving signal off.

Further, the variable resistors will be installed at least two more and compared each variable resistor one another to check the difference value. If the difference value is also higher than the predetermined value, the electronic control unit 7 will produce the alarm signal and stop the driving car.

As described hereinbefore, the speed control apparatus of the present invention having at least two variable resistors in the accelerator pedal, detect the speed control signals from two variable resistors respectively, and compare the difference value between two detected speed control signals with the predetermined value each other to check normal or abnormal condition for driving the car.

Therefore, even if one of the variable resistors is out of order, the alarm signal is provided to the driver to stop driving operation by cutting off the driving signal and thereby preventing traffic accidents.

What is claimed is:

1. A speed control apparatus for an electric car, comprising:

at least two variable resistors for generating speed control signals, each resistance value of said variable resistors varying in accordance with stepping on the accelerator pedal;

waveform shaping means for waveform-shaping output signals of said variable resistors to remove noise components and amplifying the waveform-shaped output signals;

interface means for selectively providing said output signals of said waveform shaping means in accordance with a control signal;

analog-to-digital conversion means for converting output signal of said interface means into a digital signal;

electronic control means for providing said control signal to said interface means so as to selectively receive one of said speed control signals from said variable resistors to produce a driving signal, said electronic control means detecting a difference value between said speed control signals, controlling a driving speed of said electric car according to selected one of said speed control signals if said detected difference value is lower than a predetermined value, and producing an alarm control signal for cutting off said driving signal to stop said electric car, if said detected difference value is higher than a predetermined value; and alarm means for producing an alarm signal according to said alarm control signal provided from said electronic control means.

2. A speed control method for an electric car, comprising the steps of:

1) inputting at least two speed control signals for controlling a driving speed of the electric car which are generated by stepping on an accelerator pedal of the electric car;

2) calculating a difference value of the two speed control signals inputted at step 1;

3) comparing the difference value calculated at step 2 with a predetermined value;

4) selecting one of the two speed control signals;

5) controlling a driving speed of the electric car in accordance with the selected speed control signal if the difference value compared at step 3 is lower that the predetermined value;

6) signaling an abnormal condition and cutting off the speed control signal to stop the car if the difference value compared at step 3 is higher than the predetermined value.

* * * * *